United States Patent [19]

Pearsall et al.

[11] Patent Number: 5,515,102
[45] Date of Patent: May 7, 1996

[54] CHARGE COUPLED DEVICE APPARATUS HAVING MEANS FOR CORRECTING FOR CHANGES IN THE CHARGE TRANSFER EFFICIENCY OF A CHARGE COUPLED DEVICE

[75] Inventors: Denton Pearsall, Bethel; John Stein, Danbury, both of Conn.

[73] Assignee: Hughes Aircraft Company, Los Angeles, Calif.

[21] Appl. No.: 28,514

[22] Filed: Mar. 9, 1993

[51] Int. Cl.⁶ ..................................................... H04N 3/14
[52] U.S. Cl. ........................... 348/241; 348/249; 348/250
[58] Field of Search ........................ 358/213.17, 213.16, 358/213.15, 106, 101; 382/50; 377/58; 333/165; 348/241, 223, 227, 228, 249, 250, 230, 243, 248, 306

[56] References Cited

U.S. PATENT DOCUMENTS

| | | | |
|---|---|---|---|
| 4,042,960 | 8/1977 | Wooding, Jr. | 358/101 |
| 4,179,711 | 12/1979 | Nagumo | 358/213.17 |
| 4,224,585 | 9/1980 | Tanaka | 358/213.27 |
| 4,322,819 | 3/1982 | Hyatt | 365/45 |
| 4,343,021 | 8/1982 | Frame | 348/247 |
| 4,516,263 | 5/1985 | Dew et al. | 348/246 |
| 4,528,596 | 7/1985 | Cope | 348/243 |
| 4,542,404 | 9/1985 | Duschl | 358/213.17 |
| 4,829,379 | 5/1989 | Takaki | 348/241 |
| 4,864,407 | 9/1989 | Mulder | 348/249 |
| 5,101,271 | 3/1992 | Andrews et al. | 358/213.17 |
| 5,289,286 | 2/1994 | Nakamura et al. | 348/223 |
| 5,327,171 | 7/1994 | Smith et al. | 348/241 X |

FOREIGN PATENT DOCUMENTS 56-91482   7/1981   Japan .

*Primary Examiner*—Wendy R. Greening
*Attorney, Agent, or Firm*—W. C. Schubert; W. K. Denson-Low

[57] ABSTRACT

An apparatus (10) for correcting for changes in the charge transfer efficiency of a charge coupled device (12) includes a light source (38) for providing synthetic reference images to a preselected portion (26) of the image array (16) of the charge coupled device (12). The initial synthetic reference image is compared with subsequent synthetic references images to determine the changes in the charge transfer efficiency of the charge coupled device (12). The changes are used to correct images form the image array (16).

14 Claims, 3 Drawing Sheets

CHARGE COUPLED DEVICE APPARATUS HAVING MEANS FOR CORRECTING FOR CHANGES IN THE CHARGE TRANSFER EFFICIENCY OF A CHARGE COUPLED DEVICE

BACKGROUND OF THE INVENTION

The present invention generally relates to a charge coupled device apparatus and, in particular, relates to one such apparatus having means for correcting for changes in the charge transfer efficiency of the charge coupled device (CCD).

Charge coupled devices are well known in the art and are widely used in the field of image processing. These devices are frequently used to provide electronic signal representations of incident electromagnetic radiation intensities of a particular spectral band. The most common spectral band used for CCD image processing is the visible band.

In general, the more conventional CCD's are fabricated from silicon in order to take advantage of the inherent characteristics of the silicon crystal lattice. Each atom of crystalline silicon is covalently bonded to its neighboring silicon atom resulting in an energy band gap of about 1.12 eV. To break one of the covalent bonds, and thereby create an electron-hole pair, an energy greater than the band gap energy is required. Electromagnetic radiation in the form of photons, having wavelengths in the visible spectrum possess such energy. Hence, light in the visible spectrum results in the creation of electron-hole pairs in the silicon lattice in relation to the intensity, i.e., the number of photons per unit of area, of the incident radiation.

In order to measure the electronic charge produced by the incident photons in such a CCD a means for collecting the charge is provided. Typically, this collecting means is provided in the form of a conductive gate structure formed in an array of rows and columns. This array of rows and columns defines an array of image elements generally referred to as pixels. Thus, it becomes possible, by applying the appropriate electrical potential to the various gate elements, to cause the free electrons created by incident photons to migrate along a row, or column. In this fashion an electronic signal representative of the intensity of the light radiation impinging upon the pixels can be provided as an output of the array. It is important to recognize that the electronic charges from the pixels furthest away from the output of the array undergo thousands of transfers depending on the size of the array.

Hence, it will be recognized that the charge transfer efficiency, i.e., the efficiency with which an electronic charge is moved from one pixel to an adjacent pixel is a critical parameter of a CCD. The charge transfer efficiency of a CCD becomes of particular importance when extremely low light levels are being sensed.

Although many environments can cause changes in the charge transfer efficiency of a CCD one of the more severe environments is outer space. For example, an outer space environment exposes a CCD to random high energy radiation and particle bombardment. Such conditions generally result in changes to the charge transfer efficiency of a CCD that are not only of unknown magnitude but are, consequently, uncompensated for when the image received by the CCD is processed.

In one particular application, CCDs are used to image stars for navigational purposes. For example, in order to accurately locate a space vehicle in outer space three points of reference are needed. Such points of reference are, most frequently, determined by the use of star trackers. A star tracker, in simplistic terms, is a device on a space vehicle that images stars and provides such images to an on-board processing unit that compares the position of the stars image provided by the CCD with pre-programmed celestial information. By use of information from the star tracker, preferably from a plurality of directions, the on-board processing unit calculates the precise location of the vehicle in space. Generally, if the location determined by the on-board processing unit does not match the anticipated, or predicted, location for the vehicle, the vehicle is commanded to move until the measured location is the same as the anticipated, or predicted, location.

An uncompensated change in the charge transfer efficiency of the CCD can result in images that misrepresent the position of a star or other celestial body. Under such conditions, the on-board processing unit would be provided with erroneous star location information. Thus, the position of the space vehicle would be erroneously determined and would not accurately match the anticipated, or predicted, location for the vehicle and, by compensating to match the measured location to the anticipated, or predicted, location, the vehicle could, in fact, be caused to move off course.

Consequently, it is highly desirable to provide a charge coupled device apparatus having means for correcting for changes in the charge transfer efficiency of the charge coupled device.

SUMMARY OF THE INVENTION

Accordingly, it is one object of the present invention to provide a charge coupled device apparatus having means for correcting for changes in the charge transfer efficiency of a CCD such that the above-recited drawbacks exhibited by conventional CCDs are overcome.

This object is accomplished, at least in part, by a charge coupled device apparatus having means for correcting for changes in the charge transfer efficiency of the charge coupled device.

Other object and advantages of the present invention will become apparent to those skilled in the art from the following detailed description of the invention read in conjunction with the appended claims and the drawings attached hereto.

BRIEF DESCRIPTION OF THE DRAWINGS

The drawings, not drawn to scale, include.

DETAILED DESCRIPTION OF THE INVENTION

Figure 1:
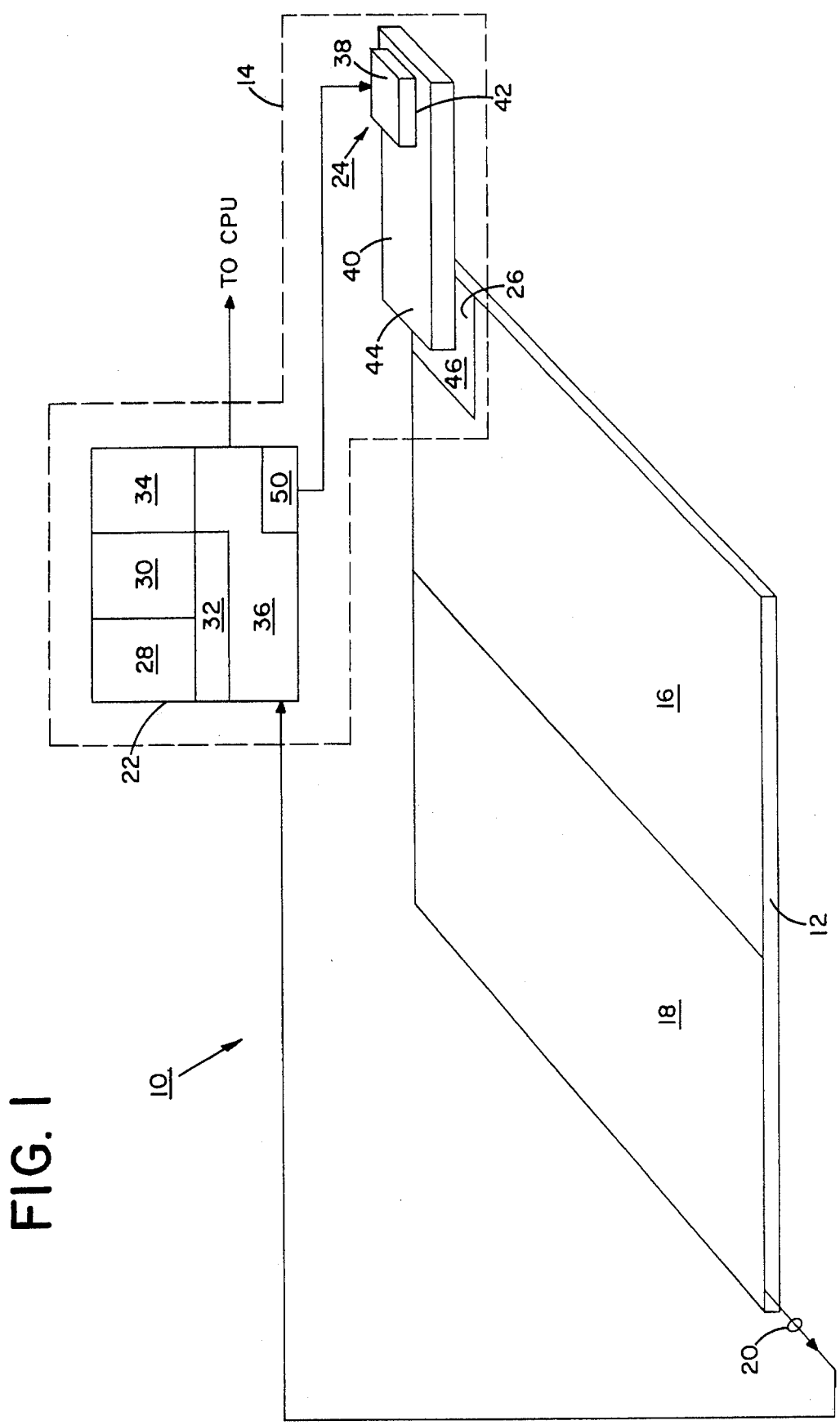
FIG. 1 which is a pictorial view of an charge coupled device apparatus embodying the principles of the present invention.

A charge coupled device apparatus, generally indicated at 10 in the FIG. 1 and embodying the principles of the present invention, includes a charge coupled device (CCD) 12 and means 14 for correcting for changes in the charge transfer efficiency of the charge coupled device 12. In the embodiment shown, the CCD 12 includes an image array 16 and a storage array 18. The storage array 18 includes an output 20 that provides image information to an image dam processing unit 22.

In the preferred embodiment, the means 14 for correcting for changes in the charge transfer efficiency includes means 24 for providing synthetic reference images to a preselected portion 26 of the image array 16, means 28 for storing an initial synthetic reference image, means 30 for storing subsequent reference images, means 32 for comparing subsequent reference images with the initial synthetic reference image, means 34 for storing an actual image from the image array 16 and means 36 for correcting the actual image.

In the embodiment shown in the Figures, the means 24 for providing synthetic reference images includes a light source 38 and means 40 for guiding the light from the light source 38 to the preselected portion 26 of the image array 16. In one particular embodiment, the light source 38 is a light emitting diode (LED) although other light sources can also be used. The light source 38 interfaces with the means 40 for guiding the light therefrom to the preselected portion 26 of the image array 16. In this embodiment, the light guiding means 40 can be a light pipe, an optical fiber, a light diffuser, or the like that interfaces with the light source 38 at one end 42 thereof and with the preselected portion 26 of the image array 16 at the other end 44 thereof. The advantage of a light diffuser is that it would provide a more uniform illumination across the light source 38. Preferably, the interfaces at the ends, 42 and 44, of the means 40 are light tight so that negligible or no stray light reaches image array 16 of the CCD 12 outside of the preselected portion 26 thereof.

Figure 2:
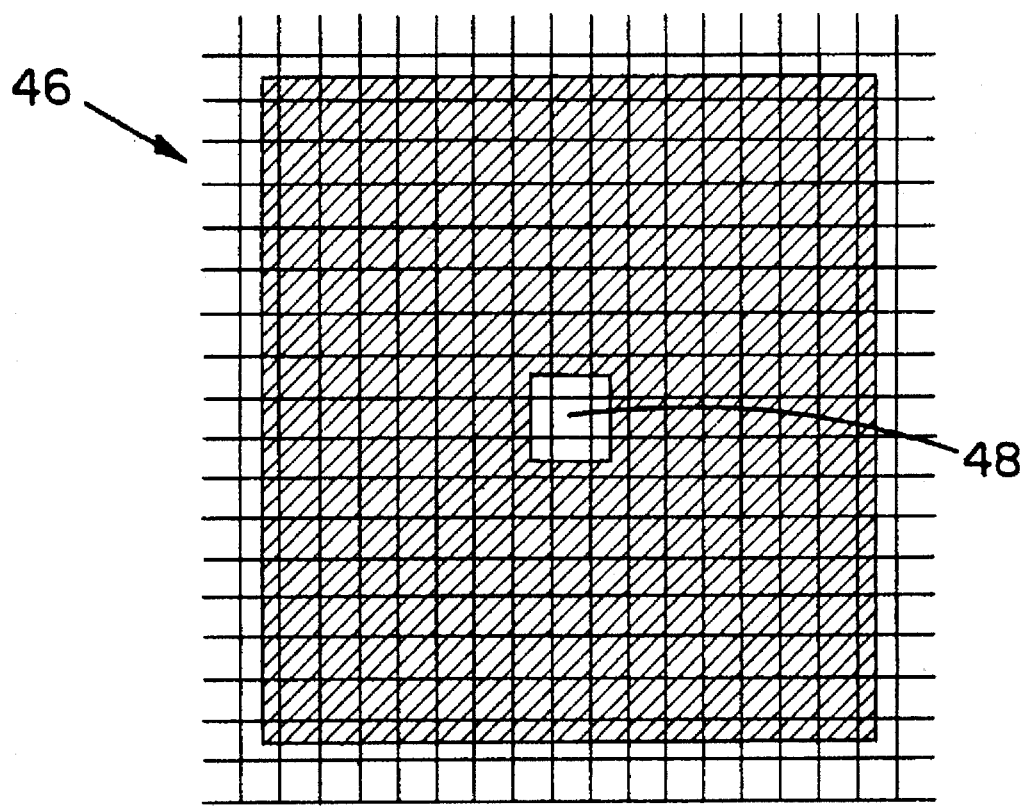
FIG. 2 which is a plan view of a portion of the charge coupled device apparatus shown in FIG. 1.

As shown most clearly in FIG. 2, the preselected portion 26 of the means 14 is disposed on the image array 16 and includes an opaque mask 46 having an opening 48, or pinhole, therethrough. Preferably, the preselected portion 26 is disposed on the image array 16 at a location most distal from the output 20 of the CCD 12. This location is preferred to ensure that synthetic reference images provided by the light source 38 through the opening 48 are affected most significantly by changes in the charge transfer efficiency such as those resulting from exposure to non-ionizing radiation environments. That is, in such a location, the synthetic reference images provided through the opening 48 in the opaque mask 46 undergo the maximum possible number of charge transfers to reach the output 20 of the CCD 12. Hence, any changes to the environment of the CCD 12 will affect the synthetic reference images. However, it will be understood that the opaque mask 46 can be disposed anywhere on the image array 16 so long as the position thereof is known. Further, the opening 48 can be disposed anywhere within the preselected portion 26 so long as the position thereof in known. In one preferred embodiment, the image array 16 is 1024 pixels by 1024 pixels, the preselected portion 26 is 16 pixels by 16 pixels and the opening 48 is 2.5 pixels by 2.5 pixels and centered within the preselected portion 26.

The processing unit 22 is, in essence, computers which can either be dedicated solely to the apparatus or be a portion of a main on-board computer that performs other functions. Regardless, the processing unit 22, as depicted in FIG. 1, includes the means 28 for storing an initial synthetic reference image, the means 30 for storing subsequent synthetic reference images, the means 32 for comparing subsequent synthetic reference images with the initial synthetic reference image, the means 34 for storing actual images from the image array 16, the means 36 for correcting the actual image and means 50 for controlling the generator of synthetic reference images.

In one particular embodiment, the means 28 for storing the initial synthetic reference image is nonvolatile memory, i.e. computer memory that is not lost when power is removed or in the preferred embodiment unable to be written over by other data. The means 30 for storing subsequent synthetic reference images can be volatile memory as can be the means 34 for storing actual images for the image array 16. The means 32 for comparing subsequent synthetic reference images and the means 36 for correcting an actual image are, preferably, computational operations described hereinbelow.

In order to more fully understand the scope and operation of the present invention, it must be understood that, in general, star trackers obtain image centroid information. That is, the image information received from a CCD of a star tracker is the relative location of one or more stars. Hence, as a result in changes to the charge transfer efficiency of the CCD, the location of stars, as observed from the image centroid information, can be incorrectly determined.

Figure 3:
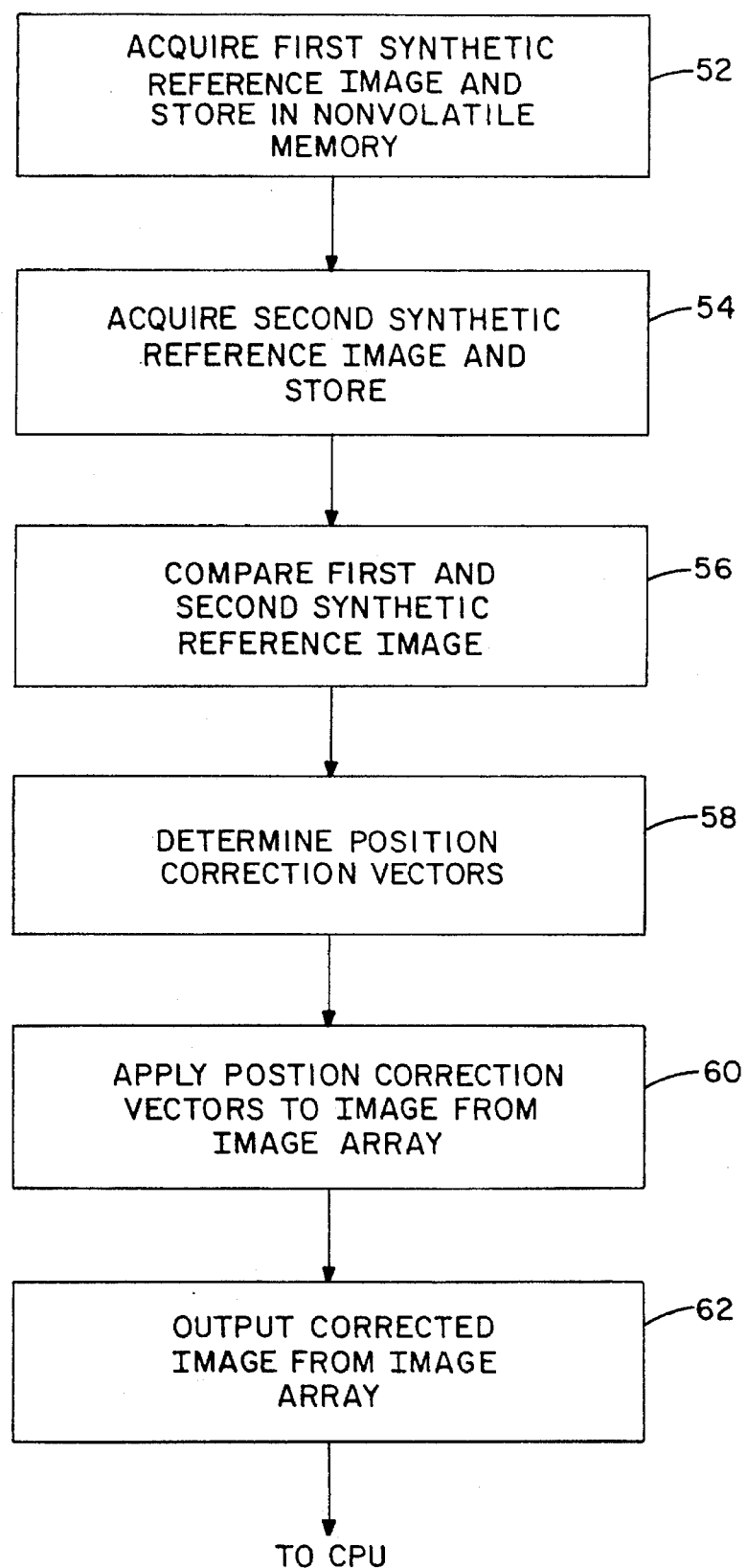
FIG. 3 which is an exemplary flow diagram of one embodiment of a signal processing unit particularly useful in conjunction with the charge coupled device apparatus shown in FIG. 1.

In operation, the following method, as shown in the flow diagram of FIG. 3, can be employed for the on-board correction of star position data. As a first step 52 prior to field use, for example, at the time of instrument fabrication, the light source 38 is activated and an image of a "synthetic star" is acquired and stored in the non-volatile memory 28. Although a complete image pattern could be stored, it is preferred that, in order to reduce the required non-volatile memory, only the position of the centroid synthetic reference image centered be retained. For exemplary purposes, this position information is referred to hereinafter as having a horizontal component and a vertical component. Hence, this initial synthetic reference image can be, for example, X=0, Y=0.

During operation, depicted at block 54, subsequent synthetic reference images are periodically acquired. Preferably, at the time of each such subsequent acquisition the "synthetic star" image centroid is determined and compared, depicted at block 56 in FIG. 3, to the initial location stored in the non-volatile memory 28.

Differences between the two images may be attributed to changes, or degradation, in the charge transfer efficiency of the CCD 12. From the change in charge transfer efficiency a pair of centroid position correction factors are derived, depicted at block 58 in FIG. 3. Preferably, the centroid position corrective factors are orthogonal and are stored in the volatile memory 30. In one example, the resultant X factor could be equal to −3 and the Y factor could be equal to +2.

The centroid position correction factors are then applied as indicated at block 60 to the centroid position of actual stars imaged by the image array 16. That is, in the above example, +3 would be weighted in the ratio at the indicated X coordinate position to the X coordinate position of the synthetic image and then added to the X coordinate positions. Preferably, the two orthogonal axes factors are processed independently. The corrected image from the image array 16 can then be outputted as indicated at block 62 and used by, for example, the navigational processor to ascertain the correct location of the space vehicle during orbit.

Although the present invention has been described herein with respect to a specific embodiment it will be understood that other configuration and arrangements may also be used that do not exceed the spirit and scope. Hence, the present invention is deemed limited only by the appended claims and the reasonable interpretation thereof.

What is claimed is:

1. A method for correcting for changes in the charge transfer efficiency of a charge coupled device having an image array; said method comprising the steps of:

generating an initial reference image in a preselected portion of said charge coupled device;

storing said initial reference image in a memory;

generating a subsequent reference image in said preselected portion of said charge coupled device;

comparing said subsequent image with said initial reference image to determine the differences therebetween and generating correction factors from said differences; and applying said correction factors to an image from the image array of said charge coupled device to correct for changes in the charge transfer efficiency of said charge coupled device.

2. The method as claimed in claimed in claim 1, wherein said reference image generating step includes providing a light source and means for guiding light from said light source to said preselected portion of said charge coupled device.

3. The method as claimed in claim 2 said generating of correction factors includes generating centroid factors.

4. The method as claimed in claim 1 wherein said generating of correction factors includes generating two orthogonal correction factors.

5. Charge coupled device apparatus comprising:

a charge coupled device having an image array and an output; and means for correcting for changes in the charge transfer efficiency of the charge coupled device, comprising:

synthetic reference image generating means optically coupled to the image array for applying initial and subsequent synthetic reference images to a preselected portion of the image array; and image processing means coupled to the output of the charge coupled device for comparing the subsequent synthetic reference images to the initial synthetic reference image to generate correction signals indicative of the differences therebetween, which differences are indicative of changes in the charge transfer efficiency of the charge coupled device, and for applying the correction signals to actual images generated by the charge coupled device to correct the relative position of the actual images in response thereto.

6. The apparatus as claimed in claim 5, wherein said means for providing reference images includes a light source and light guiding means for guiding light from said light source to said preselected portion of said image array.

7. The apparatus as claimed in claim 6, wherein said light guiding means is a light pipe.

8. The apparatus as claimed in claim 6, wherein said preselected portion is defined by an opaque mask having an opening therein.

9. The apparatus as claimed in claim 8, wherein, said opening is centered within said opaque mask.

10. The apparatus as claimed in claim 6, wherein said preselected portion is disposed on said image array at a known location from said output of said charge coupled device such that said reference images undergo a known number of charge transfers.

11. The apparatus as claimed in claim 6, further comprising:

an image data processing unit having means for storing an initial reference image, means for storing subsequent reference images, means for comparing said subsequent reference images with said initial reference image, and means for correcting an image from said image array in accordance with said differences between said initial reference image and said subsequent reference images.

12. The apparatus as claimed in claim 11, wherein said means for storing said initial reference image is a nonvolatile memory.

13. A method for correcting for changes in the charge transfer efficiency of a charge coupled device having an image array; said method comprising the steps of:

generating an initial reference image in a preselected portion of said charge coupled device by providing a light source and means for guiding light from said light source to said preselected portion of said charge coupled device;

storing said initial reference image in a memory;

generating a subsequent reference image in said preselected portion of said charge coupled device;

comparing said subsequent image with said initial reference image to determine the differences therebetween and generating centroid correction factors from said differences; and applying said correction factors to an image from the image array of said charge coupled device to correct for changes in the charge transfer efficiency of said charge coupled device.

14. A method for correcting for changes in the charge transfer efficiency of a charge coupled device having an image array; said method comprising the steps of:

generating an initial reference image in a preselected portion of said charge coupled device;

storing said initial reference image in a memory;

generating a subsequent reference image in said preselected portion of said charge coupled device;

comparing said subsequent image with said initial reference image to determine the differences therebetween and generating two orthogonal correction factors from said differences; and applying said correction factors to an image from the image array of said charge coupled device to correct for changes in the charge transfer efficiency of said charge coupled device.

* * * * *